United States Patent [19]

Cowpland

[11] 3,800,095

[45] Mar. 26, 1974

[54] POWER SUPPLY CIRCUIT FOR AN ELECTRONIC TELEPHONE SET

[75] Inventor: Michael C. J. Cowpland, Ottawa, Ontario, Canada

[73] Assignee: Microsystems International Limited, Montreal, Quebec, Calif.

[22] Filed: Feb. 23, 1973

[21] Appl. No.: 335,038

[30] Foreign Application Priority Data

Aug. 27, 1971 Canada ............................ 121578

[52] U.S. Cl. ............... 179/77, 179/16 F, 179/81 B, 323/8, 323/22 T

[51] Int. Cl. ............................................ H04m 19/00

[58] Field of Search .................. 323/8, 22 T, 23, 39; 179/16 R, 16 A, 16 AA, 16 E, 16 F, 16 EA, 18 F, 18 FA, 77, 81 R, 81 B

[56] References Cited

UNITED STATES PATENTS

| | | | |
|---|---|---|---|
| 3,627,952 | 12/1971 | Person | 179/16 F |
| 3,605,007 | 9/1971 | Jehle | 323/22 T |
| 3,524,124 | 8/1970 | Perkinson | 323/8 |
| 3,513,378 | 5/1970 | Kemper | 323/22 T |
| 3,462,643 | 8/1969 | Turner et al. | 323/22 T |
| 3,419,789 | 12/1968 | Gately | 323/22 T |
| 3,035,122 | 5/1962 | Livingstone | 179/16 F |

*Primary Examiner*—Kathleen H. Claffy
*Assistant Examiner*—Randall P. Myers

[57] ABSTRACT

This invention relates to a power supply having means whereby current draw through a network feeding the power supply is initially at a relatively high value when a load is placed across the output of the power supply, the current draw dropping over a predetermined time period to a substantially constant relatively low value. As will be explained the invention has particular applicability to, but is by no means limited to the field of telephony.

14 Claims, 4 Drawing Figures

PATENTED MAR 26 1974 3,800,095

INVENTOR
MICHAEL C. J. COWPLAND
BY L. Brooks Hansford
PATENT AGENT

POWER SUPPLY CIRCUIT FOR AN ELECTRONIC TELEPHONE SET

This is a continuation of application Ser. No. 176,149, filed Aug. 30, 1971, now abandoned.

This invention relates to a power supply having means whereby current draw through a network feeding the power supply is initially at a relatively high value when a load is placed across the output of the power supply, the current draw dropping over a predetermined time period to a substantially constant relatively low value. As will be explained hereinafter, the invention has particular applicability to, but is by no means limited to the field of telephony.

Conventional telephone sets operate with very low voltage across their terminals (typically of the order of 2 volts) and this voltage is used to draw relatively high current from the Central Office when the set is "off-hook" in order to pull in the supervision relays in the office. An electronic telephone set typically requires between 8 and 12 volts as its operating voltage, and this has the disadvantage that, for any given line resistance, the set will draw less direct current from the Central Office than may be required to operate the supervision relays. This problem is particularly severe where a long loop is involved between the Central Office and the set.

The present invention overcomes this problem by taking advantage of the manner in which the supervision relays work. The relays require more current to operate than to hold and in the present invention the voltage across the set is made to follow a wave-form which initially provides relatively high current draw from the Central Office after the set has gone "off-hook" and thereafter the voltage rises to give a suitable operating voltage for the set and a correspondingly lower current draw through the relays.

Thus, in accordance with the present invention there is provided a power supply circuit comprising first and second output terminals for connection to a load and first and second input terminals for connection to a potential supply means. The second input terminal being connected to the second output terminal and the first input terminal being connected to the first output terminal. A shunt voltage regulator means, comprising a first transistor with its collector connected via a first resistor to the first input terminal, and its emitter connected to the second input terminal via a second resistor, serves to control the voltage across the input terminals. The shunt voltage regulating means also comprises a first potential divider network connected across the input terminals. The first potential divider network having a resistive means serially connected with a third resistor, with the resistive means connected to the first input terminal. The junction of the third resistor and the resistive means being connected via a fourth resistor to the base of the first transistor. The power supply circuit additionally comprises a second potential divider network connected in shunt with the input terminals. The second potential divider network comprises a solid state voltage reference device connected in series with a fifth resistor with the solid state voltage reference device connected to the second input terminal and the fifth resistor connected to the first input terminal. The junction of the fifth resistor and the solid state voltage reference device being connected via a capacitance means to the base of the first transistor.

The invention will now be described further by way of example only and with reference to the accompanying drawings in which.

Figures 1, 2:
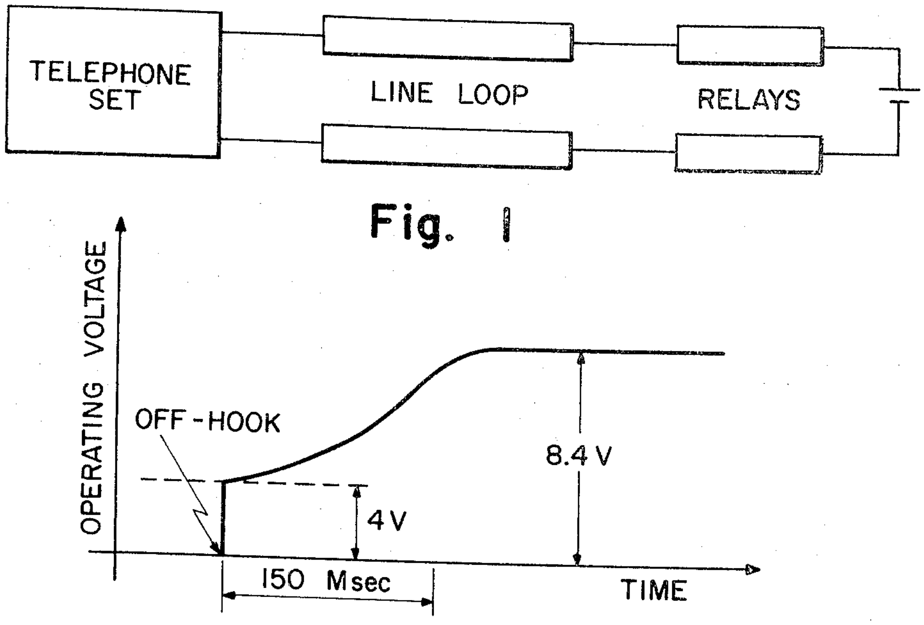
FIG. 1 is a block diagram of a basic telephone circuit to which the present invention may be applied.
FIG. 2 is a graph of operating voltage versus time for a power supply in accordance with the present invention.

Referring now to FIG. 1 of the drawings, there is shown a typical telephone circuit having a battery, supervision relays, a line loop, and a telephone set.

Referring to FIG. 2, there is shown a graph of operating voltage versus time, from which the principle of the present invention may be seen, when the set goes "off-hook" the initial voltage across the input terminals of the power supply is only about 4 volts. This rises slowly for a period of approximately 150 milliseconds until the operating voltage of the power supply, which is approximately 8.4 volts is reached. The delay between the removal of the telephone hand-piece from the hook and the initiation of operation of the set when the voltage reaches the operating voltage of 8.4 volts is unnoticable to the user but is large enough to actuate the supervision relays in the Central Office.

Figure 3:
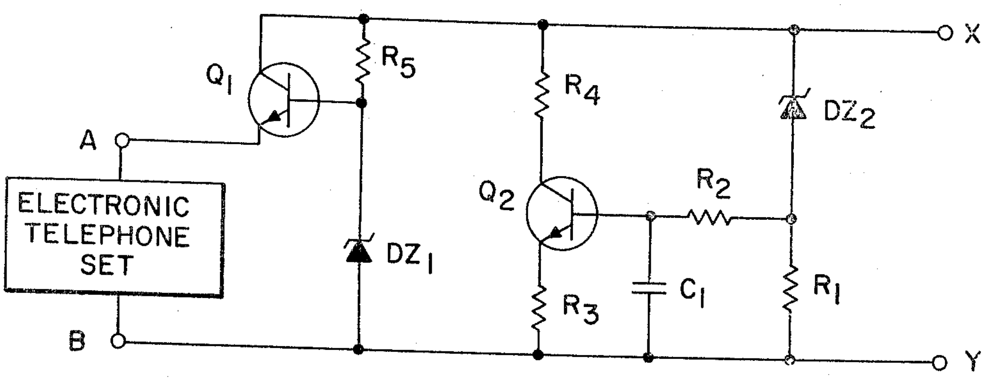
FIG. 3 is a power supply circuit as conventionally utilized in electronic telephone sets.

FIG. 3 shows a basic regulated power supply circuit as conventionally used for an electronic telephone network. The circuit comprises first and second input terminals X and Y respectively adapted for connection across the line feeding the telephone set through supervision relays from a 48 volt battery located in a Central Office for the system, as shown in the block diagram of FIG. 1. Connected in parallel across the terminals X and Y are series connected resistance means or zener diode $DZ_2$ and third resistor $R_1$; series connected first resistor $R_4$, the collector-emitter junction of a first transistor $Q_2$ and second resistor $R_3$; and series connected solid state voltage reference device zener diode $DZ_1$ and fifth resistor $R_5$, respectively. The collector-base junction of a second transistor $Q_1$ is connected across fifth resistor $R_5$, and the emitter electrode of second transistor $Q_1$ is connected to a first output terminal A. A second output terminal B is connected directly through a reference ground potential rail to second input terminal Y.

The base electrode of transistor $Q_2$ is connected through series fourth resistor $R_2$ to the junction between resistor $R_1$ and zener diode $DZ_2$. The base electrode of transistor $Q_2$ is also connected through a capacitance means such as series capacitor $C_1$ to reference ground potential.

The network constituted by diode $DZ_2$, transistor $Q_2$ and resistors $R_1$ to $R_4$ forms a shunt type regulator to maintain approximately constant voltage across the set. This is desirable to allow for more than one set "off-hook" simultaneously and also has the advantage that since the voltage is constant, the current draw will vary with and therefore give an indication of line-loop resistance and length. As the voltage across terminals X and Y tends to fluctuate — say, for example, increase — the drop across $R_1$ increases, since a constant voltage drop is maintained across diode $DZ_2$. This increases the forward bias on transistor $Q_2$, and the collector current — and hence the current draw on the line-loop-increases. The voltage drop over the line-loop therefore increases correspondingly and the potential across terminals X and Y is therefore maintained approximately constant. Conversely, if the voltage fluctuation is in the decreasing direction, the collector current through $Q_2$ decreases, thus lowering the potential drop through the line-loop and maintaining the potential across terminals X and Y approximately constant. It will be realized that the output from the network will be effectively limited by diode $DZ_2$, the breakdown value of which is about 7 voltage. The network thus functions as a voltage regulating circuit for the input potential across terminals X and Y and also an an over-voltage protection device for the remainder of the power supply.

Transistor $Q_1$, resistor $R_5$ and zener diode $DZ_1$ constitutes a series type regulator circuit which functions to provide a constant voltage supply for the electronic telephone set. The voltage across diode $DZ_1$ is constant, and therefore voltage fluctuation in the output from the over-voltage protection circuit is reflected in the potential drop across $R_5$ and the corresponding potential drop across the transistor $Q_1$. Thus, when the voltage fluctuation is in the increasing direction, the potential drop across $Q_1$ will increase, thereby maintaining a constant potential across terminals A and B. Conversely, if the fluctuation is a decrease, the potential drop across $Q_1$ decreases, and the potential across terminals A and B remains constant. Capacitor $C_1$ and resistor $R_2$ are provided to eliminate alternating current from the feedback loop of the shunt regulator which would cause the regulator circuit to load the line loop.

Figure 4:
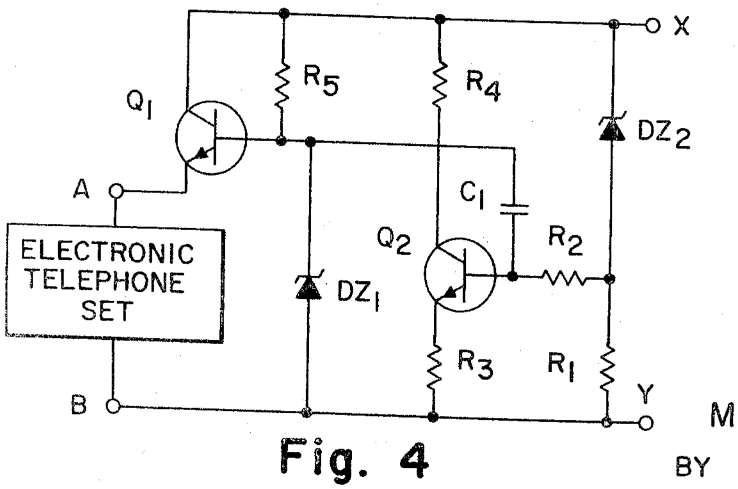
FIG. 4 is a power supply circuit in accordance with the present invention.

$C_1$ is shown in FIG. 3 as grounded to the reference ground potential rail in order to effect the smoothing. Since zener diode $DZ_1$ has a low impedance value, $C_1$ will function equally well if it is grounded through $DZ_1$ by connection to the junction of $DZ_1$ and resistor $R_5$, as shown in FIG. 4, resistor $R_5$ being chosen to be of relatively low value (typically 500 to 1,000 ohms). The novel circuit of FIG. 4 now functions according to the present invention and in the following manner. When the telephone set first goes "off-hook," $C_1$ is uncharged and input terminal X is effectively connected through $R_5$ to the base of transistor $Q_2$. Thus $Q_2$ turns on hard and draws heavy current therethrough and through the line loop and the supervision relays.

Typically, the voltage across X and Y at this time is approximately 4 volts which gives ample current draw through the relays for actuation thereof. Capacitor $C_1$ begins to charge as soon as the telephone set goes "off-hook" and current is drawn through the terminals X and Y. $C_1$ charges in bootstrap fashion via the resistance $R_5$ and resistances $R_2$, $R_1$ and the bias applied to the base of transistor $Q_2$ — and thus the current draw therethrough — falls correspondingly to the point where $C_1$ is fully charged. This is at a predetermined operating potential across terminals X and Y of approximately 8.4 volts. The time constant of the $R_5$. $C_1$ network is adjusted to give a time versus operating voltage curve as shown in FIG. 2, whereupon the high-current draw through the line-loop and relays lasts for approximately 150 milliseconds until the curve reaches a plateau at about 8.4 volts, at which level capacitor $C_1$ is fully charged.

In order to give a low capacitance for the capacitor $C_1$, as is particularly desirable if the circuit is to be fabricated in integrated circuit form, the input impedance may be raised by forming transistor $Q_2$ as a high-gain multiple transistor and increasing the value of bias resistor $R_2$. In this manner the relatively slow charging rate described above for $C_1$ may be maintained without the requirement for $C_1$ to be excessively large.

As stated above, the invention has particular application to the field of telephony because of the problems involved with energizing relays over long loops. However, it will be apparent to those skilled in the art that the power supply described and claimed herein is useful in many fields of application in its various embodiments and modification without departing from the spirit and scope of the invention.

What is claimed is:

1. In a power supply circuit comprising first and second output terminals for connection to a load, first and second input terminals for connection to a potential supply means, the second input terminal being connected to the second output terminal and means connecting the first input terminal to the first output terminal, shunt voltage regulator means for controlling the voltage across the input terminals, the shunt voltage regulator means comprising a first transistor having its collector connected via a first resistor to the first input terminal, and its emitter connected via a second resistor to the second input terminal, a first potential divider network connected in shunt with the input terminals, the first potential divider network comprising a resistive means serially connected with a third resistor, the resistive means being connected to the first input terminal, and the junction of the third resistor and the resistive means being connected via a fourth resistor to the base of the first transistor, the improvement comprising:

a. a second potential divider network connected in shunt with said input terminals, the second potential divider network comprising a solid state voltage reference device connected in series with a fifth resistor, the said device and the fifth resistor being connected to the second and first input terminals respectively;

b. capacitance means joining the base of the first transistor to the junction of the fifth resistor and the solid state voltage reference device.

2. The power supply circuit as defined in claim 1 wherein the resistive means is a first zener diode.

3. The power supply circuit as defined in claim 2 wherein the solid state voltage reference device is a second zener diode.

4. The invention as claimed in claim 3 wherein the first transistor is an n-p-n transistor, wherein the anode of the second zener diode is connected to the second input terminal and wherein the cathode of the first zener diode is connected to the first input terminal.

5. The power supply circuit as defined in claim 1 wherein the resistive means is a sixth resistor.

6. The power supply circuit as defined in claim 5 wherein the solid state voltage reference device is a zener diode.

7. In a power supply circuit comprising first and second output terminals for connection to a load, first and second input terminals for connection to a potential supply means, the second input terminal being connected to the second output terminal and the first input terminal being connected to the first output terminal, shunt voltage regulator means for controlling the voltage across the input terminals, the shunt voltage regulator means comprising a first transistor having its collector connected via a first resistor to the first input terminal and its emitter connected via a second resistor to the second input terminal, a first potential divider network connected in shunt with the input terminals, the first potential divider network comprising a resistive means serially connected with a third resistor, the resistive means being connected to the first input terminal, the junction of the third resistor and the resistive means being connected via a fourth resistor to the base of the first transistor, the improvement comprising:

a. a second potential divider network connected in shunt with said input terminals, the second potential divider network comprising a solid state voltage reference device in series with a fifth resistor, the fifth resistor being connected to the first input terminal and said device being connected to the second input terminal;

b. capacitance means joining the base of the first transistor, inserted in the connection between said first input terminal and said first output terminal, to the junction of the fifth resistor and the solid state voltage reference device;

c. a second transistor having its collector connected to the first input terminal and its emitter connected to the first output terminal, the base of the second transistor being connected to the junction of the fifth resistor and the solid state voltage reference device.

8. The power supply circuit as defined in claim 7 wherein the resistive means is a first zener diode.

9. The power supply circuit as defined in claim 8 wherein the solid state voltage reference device is a second zener diode.

10. The power supply circuit as defined in claim 9 wherein the first and second transistors are n-p-n transistors, wherein the cathode of the first zener diode is connected to the first input terminal, and wherein the anode of the second zener diode is connected to the second input terminal.

11. The power supply circuit as defined in claim 7 wherein the resistive means is a sixth resistor.

12. The power supply circuit as defined in claim 11 wherein the solid state voltage reference device is a zener diode.

13. A power supply circuit for an electronic telephone set, said circuit comprising first and second output terminals for connection to an electronic telephone set and first and second input terminals for connection to a telephone line, the second input terminal being connected to the second output terminal and the first input terminal being connected to the first output terminal, shunt voltage regulator means for controlling the voltage across the input terminals, the shunt voltage regulator means comprising a first transistor having its collector connected via a first resistor to the first input terminal and its emitter connected via a second resistor to the second input terminal, a first potential divider network connected in shunt with the input terminals, the first potential divider network comprises a first zener diode serially connected with a third resistor, the first zener diode being connected to the first input terminal, the junction of the third resistor and the first zener diode being connected via a fourth resistor to the base of the first transistor, the improvement comprising:

a. a second potential divider network connected in shunt with said input terminals, the second potential divider network comprising a second zener diode in series with a fifth resistor, the fifth resistor being connected to the first input terminal and the second zener diode being connected to the second input terminal;

b. a capacitor joining the base of the first transistor to the junction of the fifth resistor and the second zener diode;

c. a second transistor, inserted in the connection between said first input terminal and said first output terminal having its collector connected to the first input terminal and its emitter connected to the first output terminal, the base of the second transistor being connected to the junction of the fifth resistor and the second zener diode;

whereby the input impedance of the power supply circuit as seen from a telephone line changes from a relatively low value when the power supply circuit is first connected across a telephone line to a relatively higher value when the charge in the capacitor has reached its quiescent value.

14. The power supply circuit as defined in claim 13 wherein the first and second transistors are n-p-n transistors, wherein the cathode of the first zener diode is connected to the first input terminal and wherein the anode of the second diode is connected to the second input terminal.

* * * * *